(12) United States Patent
Lowndes

(10) Patent No.: US 10,024,419 B2
(45) Date of Patent: Jul. 17, 2018

(54) CRUISE CONTROL SYSTEM AND METHOD OF OPERATION FOR DOWNSHIFTING IN DESCENT FOLLOWING A REPEATED OR PROLONGED ACTIVATION OF THE DRIVER

(71) Applicant: JAGUAR LAND ROVER LIMITED, Warwickshire (GB)

(72) Inventor: Andi Lowndes, Conventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 15/304,982

(22) PCT Filed: Apr. 22, 2015

(86) PCT No.: PCT/EP2015/058725
§ 371 (c)(1),
(2) Date: Oct. 18, 2016

(87) PCT Pub. No.: WO2015/162181
PCT Pub. Date: Oct. 29, 2015

(65) Prior Publication Data
US 2017/0146116 A1    May 25, 2017

(30) Foreign Application Priority Data
Apr. 24, 2014    (GB) .................................. 1407228.4

(51) Int. Cl.
*F16H 61/02*      (2006.01)
*B60K 20/02*     (2006.01)
(Continued)

(52) U.S. Cl.
CPC ......... *F16H 61/0213* (2013.01); *B60K 20/02* (2013.01); *F16H 59/44* (2013.01);
(Continued)

(58) Field of Classification Search
CPC .... F16H 59/44; F16H 59/74; F16H 2059/663; F16H 61/0213; B60Y 2300/14
See application file for complete search history.

(56) References Cited

U.S. PATENT DOCUMENTS 5,685,801 A * 11/1997 Benford ............... B60K 31/047
                                                                477/108
5,794,170 A      8/1998 Kuroda et al.
(Continued)

FOREIGN PATENT DOCUMENTS

FR       2995378 A3    3/2014
WO    2004/028845 A1   4/2004

OTHER PUBLICATIONS

International Search Report and Written Opinion of the International Searching Authority for International application No. PCT/EP2015/058725 dated Oct. 9, 2015.
(Continued)

*Primary Examiner* — Edwin A Young
(74) *Attorney, Agent, or Firm* — Carlson, Gaskey & Olds

(57) ABSTRACT

A cruise control system of a motor vehicle includes additional functionality to address increasing vehicle speed on a down gradient. A downshift is commanded upon detection of repeated or prolonged activation of a speed-down control, the additional engine braking reducing vehicle speed to cruise speed in a manner which is within driver expectation.

20 Claims, 1 Drawing Sheet

(51) Int. Cl.
*F16H 59/44* (2006.01)
*F16H 59/74* (2006.01)
*F16H 59/66* (2006.01)
*F16H 59/36* (2006.01)

(52) U.S. Cl.
CPC ............ *F16H 59/66* (2013.01); *F16H 59/74* (2013.01); *B60Y 2300/146* (2013.01); *F16H 2059/366* (2013.01); *F16H 2059/663* (2013.01); *F16H 2061/0216* (2013.01)

(56) References Cited

U.S. PATENT DOCUMENTS

| | | |
|---|---|---|
| 2003/0105573 A1 | 6/2003 | Ishizu et al. |
| 2012/0101700 A1* | 4/2012 | Mitchell ............... B60W 10/06 701/58 |
| 2012/0271524 A1* | 10/2012 | Eriksson ............... B60W 10/08 701/93 |
| 2013/0151090 A1 | 6/2013 | Chae et al. |
| 2014/0066251 A1 | 3/2014 | Kawamoto et al. |

OTHER PUBLICATIONS

Combined Search and Examination Report under Sections 17 and 18(3) for Application No. GB1407228.4 dated Nov. 20, 2014.

* cited by examiner

CRUISE CONTROL SYSTEM AND METHOD OF OPERATION FOR DOWNSHIFTING IN DESCENT FOLLOWING A REPEATED OR PROLONGED ACTIVATION OF THE DRIVER

TECHNICAL FIELD

This invention relates to cruise control of a motor vehicle, by which a predetermined road speed is automatically maintained.

BACKGROUND TO THE INVENTION

Vehicle cruise control systems are well known. Typically a vehicle driver is provided with the possibility to enable such a system on demand, for example via a button or stalk mounted switch. Once enabled, the vehicle will endeavour to automatically maintain a pre-set road speed regardless of road gradient. The vehicle driver is typically provided with functionality to permit the pre-set road speed to be adjusted up or down, to cancel cruise and to resume cruise; cruise may also be cancelled in the event of a driver input, in particular braking.

In a vehicle with an automatic multi-speed transmission, the cruise function may also select an appropriate speed ratio, for example a downshift upon sensing a significant up gradient.

If the vehicle encounters a down gradient with cruise selected, the frictional forces acting to reduce vehicle speed may be insufficient to counter the natural tendency for the vehicle to gain momentum and thereby increase speed.

If the down gradient is significant the vehicle may gradually increase speed even if fueling of the engine is ceased. In such circumstances it has been proposed to provide automatic braking whereby the vehicle brakes are actuated to reduce speed so that the pre-set vehicle speed is maintained.

Automatic vehicle braking is typically a complex and relatively expensive vehicle system; what is required is a relatively simple means of reducing vehicle speed, which is intuitive, and which is intelligent.

SUMMARY OF THE INVENTION

According to a first aspect of the invention there is provided a cruise control system of a motor vehicle, said system including a driver input to permit cruise speed to be reduced and system output for causing a downshift of a vehicle transmission in response to operation of said driver input by one of repeated activations and prolonged activation.

The invention avoids an automatic downshift when the driver is not anticipating a downshift, for example in circumstances where the driver has not noticed a slight increase in vehicle speed on a down gradient. An unanticipated downshift may disturb the driver into thinking that a vehicle fault has developed, and in such circumstances the driver may forget that cruise has been enabled. On the other hand, upon repeated or prolonged operation of a speed-down input, the driver will expect a response from the vehicle and accordingly a downshift will not be a surprise; furthermore the driver is unlikely to suppose that the downshift relates to a vehicle fault or the like.

The driver input may be any selectable number of repeated speed-down inputs with a predetermined time period, for example five activations of a speed-down switch within a period of three seconds. In the alternative the input may be prolonged activation of a speed-down switch, for example for two seconds or more.

Downshifting of a vehicle transmission results in additional engine braking, whilst cruise control remains enabled, and permits a vehicle speed reduction in a manner which is not a surprise to the vehicle driver. Accordingly the invention provides an intelligent approach to responding to an increase in vehicle speed on a down gradient whilst cruise control is enabled.

In order to distinguish the driver input of the invention from an input which commands a reduction in cruise speed, the functionality of the invention is enabled upon recognizing certain entry conditions. These conditions may be simply repeated or prolonged activation of said driver input, at a threshold rate or for a predetermined period.

In an embodiment of the invention the functionality may be enabled upon system recognition of an increasing vehicle speed in conjunction with zero fueling or upon system recognition of a negative (down) road gradient, or both.

Exit conditions for the functionality of the invention may be for example a reduction in road speed, and/or fueling of the engine and/or cessation of the negative gradient and/or recognition of a zero or positive (up) road gradient.

According to a second aspect of the invention there is provided a method of operating a cruise control system of a vehicle, said system having a driver input to permit cruise speed to be reduced, and an output for causing a downshift of a vehicle transmission, the method comprising: detecting one of repeated activations of said driver input and prolonged activation of said driver input; and in response causing a downshift of the vehicle transmission.

The number of repeated activations may be selectable for example five within a period of three seconds. The period of prolonged actuation may also be selectable, for example two seconds.

The method may additionally include detecting a reduction in road speed, and resuming normal cruise control at the pre-set cruise speed.

Additional functionality may provide for a time lag before an upshift is commanded by the cruise control system, to avoid a hunting phenomenon. During the time lag, cruise speed may be maintained by additional fueling in the downshifted transmission ratio.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

One or more embodiments of the invention will now be described, by way of example only, with reference to the accompanying drawings, in which.

With reference to the drawings.

The module 20 has outputs 24, 25 for controlling fueling of an engine 26 of the vehicle, and for commanding selection of a desired speed ratio in a transmission 27 of the vehicle.

Figure 1:
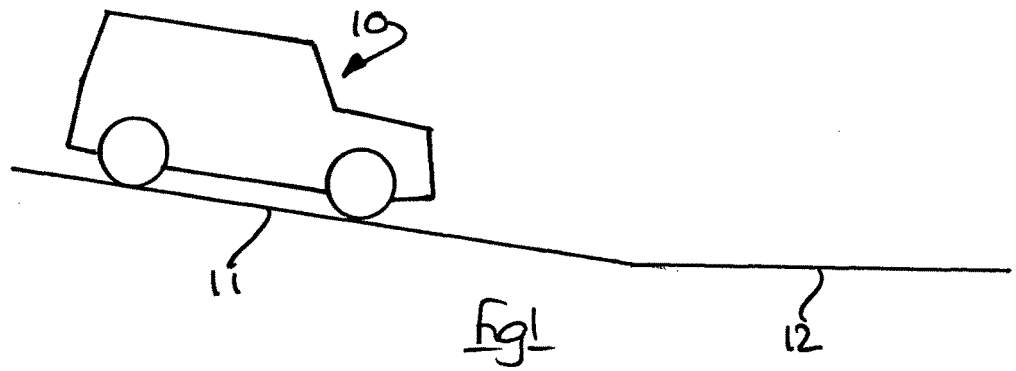
FIG. 1 illustrates a vehicle 10 on a road with a down gradient 11, followed by gradient 12 which is neither up nor down.
Figure 2:
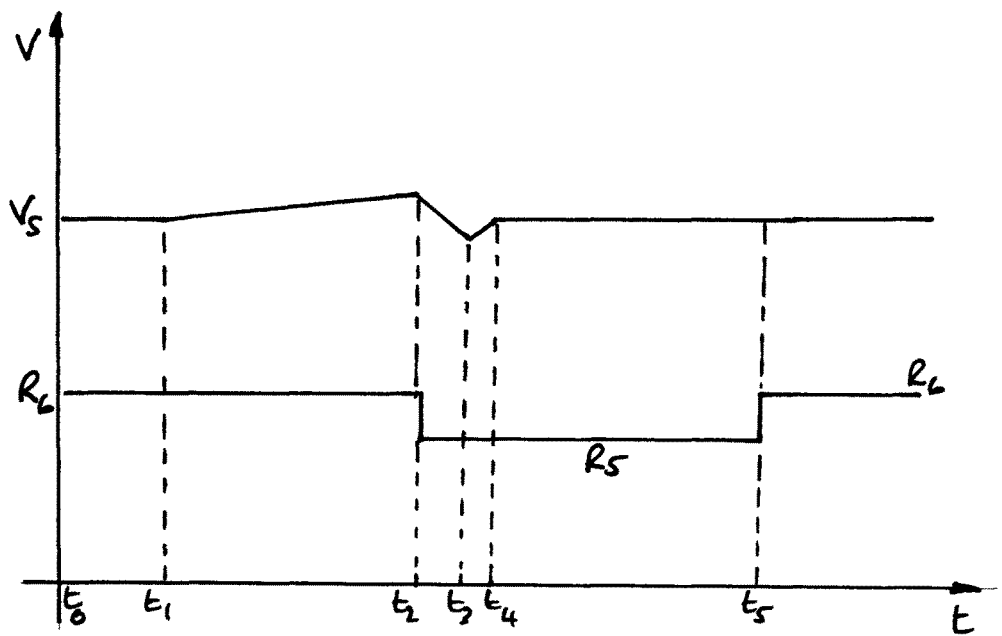
Figure 3:
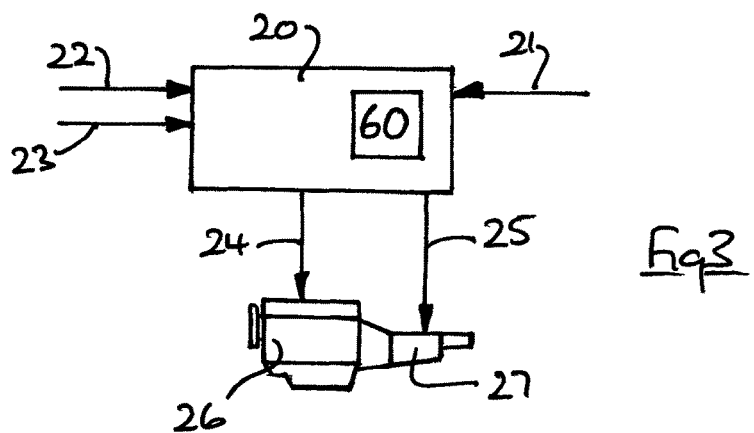
FIG. 3 illustrates schematically a cruise control module 20 having a road speed input signal 21, an 'enable' signal 22 and a 'speed down' signal 23. The module may have other functionalities, such as 'speed up', 'cancel' and 'resume', which are omitted for reasons of clarity.

FIG. 2 illustrates graphically one sequence of operation of the cruise control module according to the invention.

At time $t_o$ cruise control is enabled by a signal at input 22; vehicle speed $V_s$, as indicated by input 21 is 60 mph. The selected speed ratio is $R_6$. At time $t_1$ vehicle speed begins to increase above $V_s$ due to increased momentum on the down gradient. The cruise control module 20 does not respond.

At time $t_2$ the vehicle driver notices that vehicle speed is above $V_s$ and responds by providing a repeated or prolonged speed down input signal 23. In response the module 22 outputs a signal 25 to command a downshift of the transmission to $R_5$, following which vehicle speed reduces below $V_s$.

At time $t_3$ the vehicle speed reduction is detected from input 21 by the module 20, and at this stage several alternative actions may be taken.

In one response, as illustrated in FIG. 2, the lower speed ratio ($R_5$) is maintained after $t_3$, but engine fueling may be re-commenced to increase vehicle speed to $V_5$ at $t_4$; thereafter $V_5$ is maintained until $t_5$ where an upshift to $R_6$ is commanded.

The period $t_4$-$t_5$ may be selected to avoid hunting between the transmission speed ratios, or an upshift may be commanded upon detection of a less steep gradient 12; in the latter case the cruise control module may be provided with an additional input indicative of gradient.

In an alternative (not illustrated) the module 20 may command an immediate upshift to $R_6$ at $t_4$, it being possible that (should the down gradient continue) cessation of fueling may again be commanded followed by a repetition of the control sequence of the period $t_1$-$t_4$.

The cruise control module may be responsive to a greater or lesser gradient to select one or other of the control strategies mentioned above.

For reasons of efficiency, many transmissions have a large number of sequential, closely spaced speed ratios, for example nine or ten. In an embodiment of the invention the module 20 may command a downshift through two or even three speed ratios in order to ensure that engine braking is sufficient to reduce vehicle speed, and not merely to maintain vehicle speed at an elevated level.

With reference to the example given above, at time $t_3$ the transmission may select speed ratio $R_4$ to achieve speed reduction, and then select speed ratio $R_5$ at time $t_4$ to maintain vehicle speed without significant speed increase or decrease. Clearly, exact speed matching depends upon gradient, but such a strategy may better maintain a steady speed over a longer period of time.

Other drive functionality is not affected by the invention. For example the vehicle driver may manually select a downshift if desired and if cruise is automatically disabled thereby, it may be re-enabled manually.

The functionality of the invention may be selectable on demand, or may be automatically selected (or de-selected) upon each engine re-start or each ignition event.

The invention provides additional inexpensive functionality to permit cruise to remain enabled whilst controlling speed on a down gradient in a manner which is intelligent and intuitive to a vehicle driver.

The operational sequence described in relation to FIG. 2 provides vehicle speed $V_s$ as the control input, to which the cruise control module makes an appropriate response.

In another embodiment of the invention the cruise control module 20 may be adapted to command selection of a speed ratio according to the capability of the vehicle engine to impose a drag torque, which in turn is a function of engine speed.

Accordingly, upon entry to the functionality of the invention, the module 20 may be provided with, or may calculate, vehicle engine speed. An algorithm or look-up table may be used to determine available engine braking for several speed ratios lower than the instant speed ratio, and a processor 60 of the cruise control module determines which lower speed ratio should be commanded to obtain the desired vehicle deceleration.

During the period that the control strategy of the invention is operational, the module 20 may continually monitor the rate of change of vehicle speed $V_s$, and compare this value with the level of engine braking available in several successive speed ratios, so that the commanded speed ratio is the highest that can achieve cruise speed at the instant gradient of the road. The refresh rate for such a calculation may be in the range 5-10 Hz or more.

This latter embodiment provides predictive rather than reactive control, and ensures that upon exit of the control strategy of the invention (i.e. resumption of standard cruise control), the vehicle transmission will not be commanded to make plural upshifts in a very short time period. The transmission will gradually upshift as the gradient eases so that the vehicle driver and occupants will experience a timely succession of speed ratio changes appropriate to the instant road gradient.

Although described as a single module 20, it will be realised that the additional functionality provided by the invention may be incorporated or distributed in a number of vehicle control systems including those particularly associated with the vehicle engine and the vehicle transmission.

Modifications and changes to the invention are envisaged within the scope of the appended claims.

Aspects of the invention will be apparent from the numbered paragraphs that follow:

1. A method of operating a cruise control system of a vehicle, said system having a driver input to command a reduction in vehicle speed, and an output for causing a downshift of a vehicle transmission, the method comprising:
   detecting one of repeated activations of said driver input and prolonged activation of said driver input, and in response
   causing a downshift of the vehicle transmission.
2. The method of aspect 1 wherein said repeated activations are at a rate greater than 2 Hz.
3. The method of aspect 2 wherein said repeated activations meets or exceeds a threshold of four.
4. The method of aspect 2 wherein said prolonged activation is two seconds or more.
5. The method of aspect 1 said system having a vehicle speed input, and the method being enabled by
   detecting an increase in vehicle speed above a pre-set cruise speed.
6. The method of aspect 5, said system having an engine fueling input indicative of instant fueling of the vehicle engine, and the method being enabled by
   detecting zero fueling of the vehicle engine.

7. The method of aspect 1, said system including a gradient input indicative of instant road gradient, and the method being enabled by:
detecting a negative road gradient.
8. The method of aspect 5, and disabled by detecting a vehicle speed at or below a pre-set cruise speed.
9. The method of aspect 6, and disabled by:
detecting fueling of said vehicle engine.
10. The method of aspect 7, and disabled by:
detecting a non-negative road gradient.
11. The method of aspect 1 wherein said output causes a downshift of two or more sequential speed ratios.
12. The method of aspect 1, said system having an indicator of vehicle engine speed, and the method comprising:
continually determining for a plurality of potential downshift ratios, the available amount of engine braking at the instant engine speed,
determining the downshift ratio which best achieves a desired vehicle deceleration rate;
commanding downshift to said downshift ratio.
13. The method of aspect 12 wherein the available amount of engine braking in said downshift ratios is determined from instant engine speed by reference to an algorithm or to a look-up table.
14. The method of aspect 12 comprising:
continually determining for a plurality of potential upshift ratios, the available amount of engine braking at the instant engine speed,
detecting that vehicle speed is substantially equal to cruise speed;
determining the upshift ratio which best maintains cruise speed;
commanding an upshift to said upshift ratio.
15. A cruise control system of a motor vehicle, said system including a driver input to permit cruise speed to be reduced, and a system output to cause a downshift of a vehicle transmission in response to one of operation of said driver input by one of repeated activations and prolonged activation.
16. A cruise control system according to aspect 15, and including a gradient input indicative of road gradient.
17. A cruise control system according to aspect 15 and including an engine speed input indicative of instant vehicle engine speed.
18. A cruise control system according to aspect 15 and including an engine fueling input indicative of instant fueling of a vehicle engine.
19. A cruise control system according to aspect 15 incorporated in an engine and transmission of a motor vehicle.
20. A motor vehicle incorporating a cruise control system according to aspect 15.

The invention claimed is:

1. A method of operating a cruise control system of a vehicle, said system having a driver input to command a reduction in vehicle speed, and an output for causing a downshift of a vehicle transmission, the method comprising:
detecting at least one of repeated activations of said driver input and prolonged activation of said driver input, and in response
causing a downshift of the vehicle transmission.
2. The method of claim 1, wherein said repeated activations are at a rate greater than 2 Hz.
3. The method of claim 2, wherein a number of said repeated activations meets or exceeds a threshold of four.
4. The method of claim 1, wherein said prolonged activation occurs for at least two seconds.
5. The method of claim 1, wherein said system has a vehicle speed input, and the method is enabled by
detecting an increase in vehicle speed above a pre-set cruise speed.
6. The method of claim 5, wherein said system has an engine fueling input indicative of instant fueling of a vehicle engine, and the method is enabled by
detecting that fueling of the vehicle engine has substantially ceased.
7. The method of claim 6, comprising at least temporarily disabling causing when detecting fueling of said vehicle engine.
8. The method of claim 5, comprising at least temporarily disabling the causing when detecting a vehicle speed at or below the pre-set cruise speed.
9. The method of claim 1, wherein said system includes a gradient input indicative of instant road gradient, and the method being enabled by
detecting a negative road gradient.
10. The method of claim 9, comprising at least temporarily disabling the causing when detecting a non-negative road gradient.
11. The method of claim 1, wherein said output causes a downshift of two or more sequential speed ratios.
12. The method of claim 1, wherein said system has an indicator of vehicle engine speed, and the method comprises:
continually determining for a plurality of potential downshift ratios, an available amount of engine braking at an instant engine speed;
determining which one of the downshift ratios best achieves a desired vehicle deceleration rate; and
commanding downshift to said one of the downshift ratios.
13. The method of claim 12, comprising:
continually determining for a plurality of potential upshift ratios, an available amount of engine braking at the instant engine speed;
detecting that vehicle speed is substantially equal to a cruise speed;
determining which one of the upshift ratios best maintains cruise speed; and
commanding an upshift to said one of the upshift ratios.
14. The method of claim 1, comprising automatically controlling a vehicle engine to attempt to cause vehicle speed to maintain a pre-set cruise speed, wherein at least the causing the downshift of the vehicle transmission is performed during the automatically controlling the vehicle engine.
15. A cruise control system of a motor vehicle, said system comprising:
a driver input to command a cruise speed to be reduced, and
a system output to cause a downshift of a vehicle transmission in response to operation of said driver input by at least one of repeated activations and prolonged activation.
16. A cruise control system according to claim 15, including a gradient input indicative of road gradient.
17. A cruise control system according to claim 15, including an engine speed input indicative of instant vehicle engine speed.
18. A cruise control system according to claim 15, including an engine fueling input indicative of instant fueling of a vehicle engine.
19. An engine and transmission of a motor vehicle incorporating a cruise control system according to claim 15.

20. A motor vehicle incorporating the engine and transmission of claim 19.

\* \* \* \* \*